United States Patent
Dearn et al.

(10) Patent No.: US 7,605,574 B2
(45) Date of Patent: Oct. 20, 2009

(54) SWITCHING REGULATOR CIRCUITS

(75) Inventors: David Dearn, Wiltshire (GB); Holger Haiplik, Swindon (GB)

(73) Assignee: Wolfson Microelectronics plc, Edinburgh (GB)

( * ) Notice: Subject to any disclaimer, the term of this patent is extended or adjusted under 35 U.S.C. 154(b) by 275 days.

(21) Appl. No.: 11/785,227

(22) Filed: Apr. 16, 2007

(65) Prior Publication Data

US 2007/0252567 A1    Nov. 1, 2007

(30) Foreign Application Priority Data

Apr. 26, 2006   (GB)   ................................ 0608192.1

(51) Int. Cl.
*G05F 1/40*   (2006.01)
(52) U.S. Cl. ..................... 323/284; 323/282; 363/21.17
(58) Field of Classification Search ......... 323/282–290; 363/21.17, 72–79, 81, 25–26, 89, 56.1
See application file for complete search history.

(56) References Cited

U.S. PATENT DOCUMENTS

| | | | |
|---|---|---|---|
| 5,305,192 A * | 4/1994 | Bonte et al. .............. | 363/21.16 |
| 5,687,066 A | 11/1997 | Cook, II | |
| 5,717,322 A | 2/1998 | Hawkes et al. | |
| 6,498,466 B1 | 12/2002 | Edwards | |
| 6,611,131 B2 * | 8/2003 | Edwards ..................... | 323/282 |
| 2004/0105284 A1 | 6/2004 | May | |

OTHER PUBLICATIONS

"Current Mode Control", Venable Technical Paper #5, pp. 1-11, Venable Industries.
Robert W. Erickson et al., Fundamentals of Power Electronics, 2nd Ed. Univ. of Colorado, Boulder Colorado, pp. 439-449 (2001).

* cited by examiner

*Primary Examiner*—Rajnikant B Patel
(74) *Attorney, Agent, or Firm*—Dickstein Shapiro LLP (57) ABSTRACT

A current-mode switching regulator including at least: an inductor; a main switch for controlling the current flow through the inductor; and a feedback control circuit for operating the main switch cyclically and to vary a duty cycle of the main switch so as to substantially maintain an output voltage of the regulator at a desired level. The feedback control circuit further includes slope compensation circuitry adding slope compensation to a signal representing the inductor current prior to the slope compensated signal being compared to the fed-back output error voltage. The regulator further includes current limiting circuitry for controlling the main switch responsive to a current limit reference signal, the current limit circuitry including adjustment circuitry for adjusting the current limit reference signal in response to the duty cycle of more than one previous cycle so as to limit current in the inductor irrespective of the output voltage and to a value which, in the steady state, is substantially independent of the duty cycle.

32 Claims, 5 Drawing Sheets

SWITCHING REGULATOR CIRCUITS

BACKGROUND OF THE INVENTION

1. Field of the Invention

The present invention relates to switching regulator circuits and in particular to switching regulator circuits which use slope compensation techniques to stabilise the regulator.

2. Description of the Related Art

Switching regulators are very commonly used in DC-DC conversion as they offer higher efficiency than linear regulators. They typically consist, in their most basic form, of an inductor, a capacitor, a diode and a switch which switches the inductor alternately between charging and discharging states. These basic elements can be arranged to form a step-down (buck), step-up (boost) or inverting buck-boost regulator.

Control of the switch has been achieved previously by techniques such as "voltage mode control" and "current-mode control". In the case of a basic constant frequency current-mode control buck converter the switch is connected to an input voltage and is closed at the beginning of a clock cycle. Closing the switch causes the current in an inductor connected between the switch and the output of the converter to rise. This current is monitored and compared against the output of an error amplifier. When the output voltage of the inductor current monitor exceeds the output voltage of the error amplifier the switch is turned off, and not turned on again until the beginning of the next clock cycle. In this way the output voltage is controlled to the required value.

It is a well known phenomenon in current-mode control regulators that when the duty cycle (switch ON time/clock period) of the converter exceeds 50%, subharmonic oscillation can occur. Subharmonic oscillation is an undesirable repeating pattern in inductor current that occurs every two or more periods. [See R. W. Erickson, D. Maksimović, *Fundamentals of Power Electronics*, $2^{nd}$ Edition, Kluwer Academic Publishers, 2001, pp. 439-449.]

It is also well known that the problem of subharmonic oscillation can be addressed by using the technique known as "slope (or ramp) compensation". This is typically done by adding a predetermined duty-cycle-independent synchronous sawtooth signal (variously termed an artificial ramp, a compensatory ramp or loosely but simply "additional slope") to the measured inductor current up slope, or alternatively by subtracting a similar signal from the error amplifier output. To ensure stability for all duty cycles up to 100%, the slope of this ramp should be equivalent to at least half of the anticipated maximum inductor current down slope.

DC-DC converters usually have some means to limit the current in the inductor. There are many different ways to implement the current limit, but it is often convenient to use the signal of "inductor current plus additional slope" to give a current limit. Examples of this are common and one way of doing this is to simply limit ("clamp") the voltage output of the error amplifier. In that case the error amplifier signal is not only used for control of the converter but also for current limiting. One drawback of this is that due to the "additional slope" the current limit has different values for different duty cycles when using a fixed voltage limit on the output of the error amplifier. This means that the true maximum current in the inductor falls proportionally with the duty cycle.

U.S. Pat. No. 6,611,131 discloses a technique to remove the effect of the "additional slope" for the current limit by increasing the current limit by the same amount as the slope on a cycle-by-cycle basis by means of an adjustable voltage clamp circuit controlled by the slope compensation circuit. This, however, has the same problem as having no slope compensation at all for the current limit comparison, in that subharmonic oscillation will occur in current limit.

SUMMARY OF THE INVENTION

It is therefore an object of the invention to provide a DC-DC regulator that alleviates these drawbacks in the prior art and addresses the problem of subharmonic oscillation while maintaining a substantially steady inductor current limit for most of its operation, independent of duty cycle.

In a first aspect of the invention there is provided a current-mode switching regulator comprising at least: an inductor; a main switch for controlling the current flow through the inductor; and a feedback control circuit for operating the main switch cyclically and to vary a duty cycle of the main switch so as to substantially maintain an output voltage of the regulator at a desired level, the feedback control circuit further including slope compensation circuitry for introducing an offset into a comparison between a signal representing the fed-back output error voltage and a signal representing the inductor current, wherein the regulator further comprises current limiting circuitry for controlling the main switch responsive to a current limit reference signal, the current limit circuitry comprising adjustment circuitry for adjusting the current limit reference signal in response to the duty cycle of more than one previous cycle so as to limit current in the inductor irrespective of the output voltage and to a value which, in the steady state, is substantially independent of the duty cycle.

Limiting the current in the inductor to a value substantially independent of the duty cycle should be understood to mean that the value to which the inductor current is limited is independent of duty cycle in the steady state, but is allowed to change in the event of a change in duty cycle, being restored to its former level over a number of cycles. By this technique, the inventors have found a way to provide a current-mode voltage regulator with slope compensation and with a steady-state inductor current limit independent of duty-cycle without subharmonic oscillations in current limit.

The current limit circuitry may control the main switch on the basis of a combination of the current limit reference signal and one of or a combination of the fed-back output error voltage signal, the inductor current signal and a slope compensation signal.

The adjustment circuitry may further comprise a low pass filter arranged to receive for each cycle a value representative of the duty cycle in that clock cycle and to combine the values for several clock cycles to generate the current limit reference. Preferably this low pass filter has a corner frequency less than the clock frequency of the regulator. In one embodiment the corner frequency of the low pass filter is an order of magnitude less than the clock frequency of the regulator.

The slope compensation circuitry may, in operation, generate a ramp signal of a predetermined amplitude during each clock cycle, and the adjustment circuitry may comprise a sample and hold circuit operable in each cycle to capture a value representative of a proportion of the ramp amplitude defined by the duty cycle in that clock cycle.

Alternatively, the adjustment circuitry may be arranged to generate a ramp signal replicating a ramp signal generated within the slope compensation circuitry, the replica ramp signal being used to generate for each clock cycle a value representative of a proportion of the ramp amplitude defined by the duty cycle in that clock cycle. In operation the generation of the replica ramp signal may be interrupted in phase with opening of the main switch so as to ramp only as far as the representative value and then to hold its value for use in generating the current limit reference signal. A sample and hold circuit may be connected to receive the replica ramp signal and to hold the representative value.

There may be further provided scaling circuitry to scale the signals in various parts of the circuit, for example to make full use of the available signal headroom. The scaling circuitry may be arranged to scale the intermediate signal, which may be of a different scale to the compensatory ramp signal, to maintain the same overall signal transfer functions as in the unscaled circuit. This scaling may include scaling or converting signals between current and voltage representations for scaling the signal corresponding to a proportion of the compensatory ramp signal.

The current limiting circuitry may further comprise a clamping circuit to act on the feedback control circuit, the clamping circuit being controlled by the current limit reference signal. The clamping circuit may comprise a comparator and a transistor, arranged such that the comparator compares the signal representing the fed-back error voltage to the current limit reference signal and, should the signal representing the fed-back output voltage exceed current limit reference signal, causes the signal representing the fed-back output voltage to be clamped, the transistor diverting excess current to ground.

Alternatively the regulator may be arranged such that the current limiting circuitry controls the main switch on the basis of a comparison of the current limit reference signal and a combination of the inductor current signal and the slope compensation signal. The current limiting circuitry may comprise a comparator for comparing the current limit reference signal and the signal representing the inductor current offset by the slope compensation circuitry, the main switch being reset should the signal representing the inductor current exceed the current limit reference signal regardless of the result of the comparison between the signal representing the fed-back error voltage and the signal representing the inductor current offset by the slope compensation circuitry. This may be done by providing an OR gate such that the main switch is reset should the signal representing the inductor current offset by the slope compensation circuitry exceed either the current limit reference signal or the signal representing the fed-back output voltage.

The regulator may comprise a rectifier. The rectifier may be a diode, or a second switch arranged to run synchronous with the main switch. The main and second switches may be arranged to be in antiphase with each other for most of the operating modes. In certain operating modes both switches can be open. The regulator may be arranged to function as a buck (step down), boost (step up) or inverting buck-boost regulator.

The regulator may comprise a current monitor for measuring the current in the inductor.

The feedback control circuit may comprise an error amplifier for producing the signal representing the fed-back error voltage from the regulator output by comparing the regulator output to a fixed reference.

The regulator may further provide circuitry to add the ramp signal to the measured inductor current up slope or alternatively, to subtract the ramp from the current limit reference signal.

In a further aspect of the invention there is provided a current-mode switching regulator comprising at least
 a main switch which controls the current flow through the inductor;
 a comparator which controls the main switch based on the current in the inductor and a reference signal fed back from a voltage output of the regulator, whereby the duty cycle of the main switch, and hence a peak current in the inductor, will change to compensate for a change in output voltage;
 a signal generator for generating a ramp signal and using this for slope compensation by offsetting one of the comparator input signals relative to the other with the ramp signal; and
 current limiting circuitry for generating a limit-adjustment signal corresponding to a proportion of the compensatory ramp signal, the proportion being dependent on the duty cycle of more than one previous clock period of the regulator, and using the limit-adjustment signal to clamp one of the comparator input signals;
 thereby substantially maintaining the inductor current limit independent of duty cycle in the steady state.

In a yet further aspect of the invention there is provided a current-mode switching regulator comprising at least
 a main switch which controls the current flow through the inductor;
 a comparator which controls the main switch based on the current in the inductor and a reference signal fed back from a voltage output of the regulator, whereby the duty cycle of the main switch, and hence a peak current in the inductor, will change to compensate for a change in output voltage;
 a signal generator for generating a ramp signal and using this for slope compensation by offsetting one of the comparator input signals relative to the other with the ramp signal; and
 current limiting circuitry for generating a limit-adjustment signal corresponding to a proportion of the compensatory ramp signal, the proportion being dependent on the duty cycle of more than one previous clock period of the regulator, and using the limit-adjustment signal to obtain a limit signal for comparison with a signal representative of the current in the inductor, whereby the limit signal or the signal representative of the current in the inductor is offset relative to the other with the ramp signal;
 thereby substantially maintaining the inductor current limit independent of duty cycle in the steady state.

In all the above the skilled person will appreciate that circuitry should be taken to include software or firmware implementation where possible.

BRIEF DESCRIPTION OF THE DRAWINGS

Embodiments of the invention will now be described, by way of example only, by reference to the accompanying drawings, in which.

DETAILED DESCRIPTION OF THE INVENTION

Figure 1:
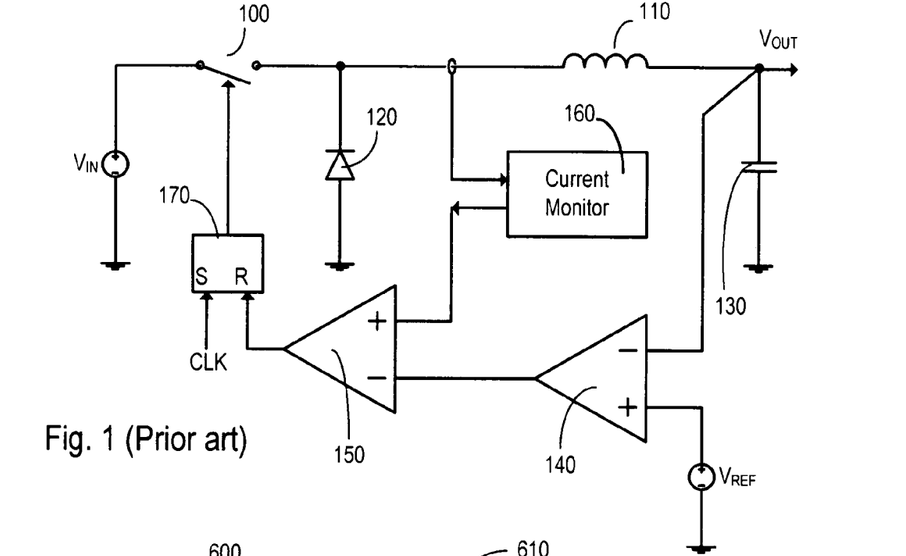
FIG. 1 shows a basic prior art current-mode switching regulator.

FIG. 1 shows a block diagram of a basic constant frequency buck converter, although it will be understood that the principles apply equally to any current-mode controlled constant frequency DC-DC converter. The buck converter consists of a power source $V_{IN}$, a switch 100, an inductor 110, a diode 120 (this could be replaced with a switch running in anti-phase to switch 100), a capacitor 130, an error amplifier 140 (with optional compensating network not shown on this drawing) and reference voltage source $V_{REF}$, a comparator 150, a current monitor 160 and a latch 170 (with a clock CLK as one input) all connected as shown. In operation, the switch 100 is connected to an input voltage $V_{IN}$ and is closed at the beginning of a clock cycle. Closing the switch causes the current in an inductor 110 connected between the switch 100 and the output $V_{OUT}$ of the converter to rise. This current is monitored by current monitor 160 and is compared by comparator 150 against the output of an error amplifier 140 (which takes one input from the converter output, the other input being connected to a reference signal $V_{REF}$). When the output voltage of the inductor current monitor 160 exceeds the output voltage of the error amplifier 140 the latch 170 is reset and switch 100 is opened, and not closed again until the beginning of the next clock cycle. The capacitor 130 acts to smooth the output. In this way the voltage $V_{OUT}$ is controlled to the required value. These types of converters are well known in the art.

It should be noted that the measured inductor current may be represented as a voltage, related to the actual inductor current by a designed scaling factor or transresistance, in some embodiments including the one described here. Alternatively this signal may be a current, possibly scaled with respect to the actual current by a dimensionless scaling factor. Similarly other signals inside embodiments may be currents rather than voltages, with appropriate choice of other components, e.g. transconductance rather than voltage amplifiers, current comparators rather than voltage comparators, switched-current rather than switched-capacitor filters etc. It may be convenient in design to scale the signals in various parts of the circuit, for example to make full use of the available signal headroom, but the scaling will be preformed so that the overall operation will be equivalent.

Figure 2:
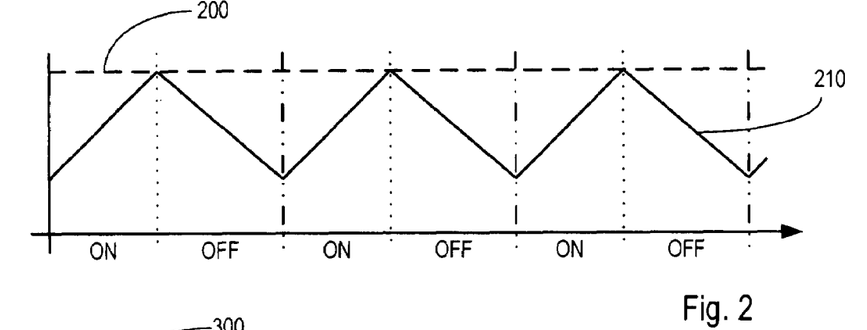
FIG. 2 shows a timing diagram of a signal representative of the measured inductor current and the error amplifier output over three clock cycles.

FIG. 2 shows the output of the error amplifier (line 200) and the variation in the measured inductor current (line 210) during a number of clock cycles (more strictly this is a signal representing the current in the voltage domain, this also being the case for the following drawings in which "current" signals are described). When the switch 100 is closed, the inductor 110 is connected to $V_{IN}$ and its current rises accordingly. At a point where the measured inductor current equals the output of the error amplifier 140, the comparator 150 output changes, thus opening the switch 100. This causes the voltage across the inductor to change polarity and magnitude from $V_{IN}$–$V_{OUT}$ to 0V–$V_{OUT}$ and therefore the inductor current to ramp negatively.

The switch 100 is then closed at the beginning of the next clock cycle, and the inductor current begins to rise again.

For clarity, the error amplifier output $V_{ERR}$ is shown constant over this timescale. In practice there will be some modulation of this level due to voltage ripple and load variation causing modulation of $V_{OUT}$, but this modulation may be rendered small by decoupling and does not affect the basic operation of the circuit over timescales of a few cycles.

Figure 3:
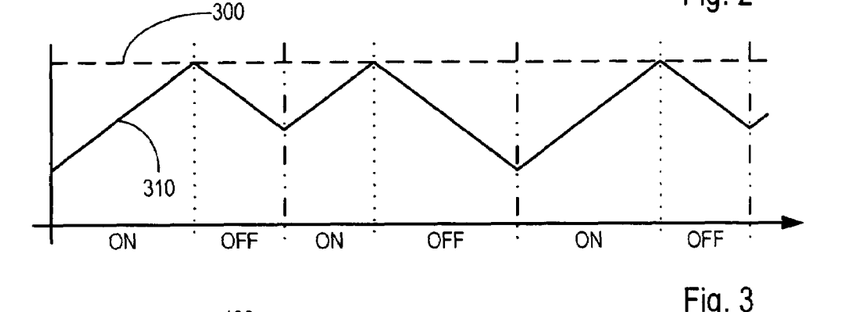
FIG. 3 shows a further timing diagram wherein the measured inductor current displays subharmonic oscillation.

FIG. 3 shows the well known phenomenon of subharmonic oscillation. As before, it shows the output of the error amplifier (line 300) and the variation in the measured inductor current (line 310) during a number of clock cycles. Subharmonic oscillation is a repeating pattern in inductor current that occurs every two or more periods. For duty cycles (ON time/Period) less than 50% any disturbances from the nominal operating point die out over time, however when the duty cycle is increased above 50%, these disturbances grow over time. This is subharmonic oscillation.

As explained previously, it is also well known that the problem of subharmonic oscillation can be addressed by using the technique known as "slope (or ramp) compensation". This is typically done by adding a predetermined duty-cycle-independent synchronous sawtooth signal to the measured inductor current, or alternatively by subtracting a similar signal from the error amplifier output. To ensure stability for all duty cycles up to 100%, the slope $m_a$ of this ramp should be equivalent to at least half of the anticipated maximum magnitude of the inductor current down slope, $-m_2$.

Figure 4:
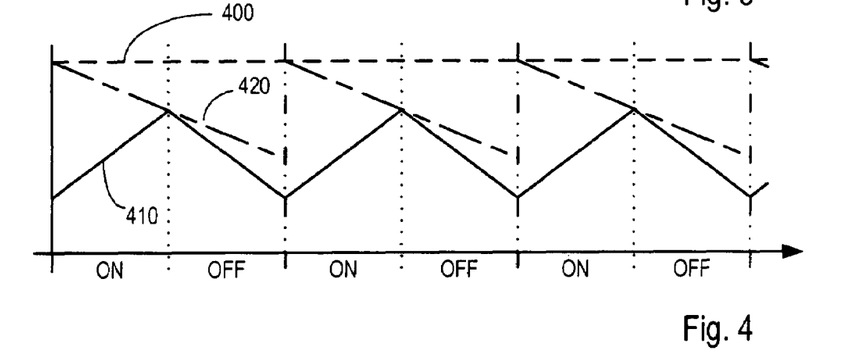
FIG. 4 shows a timing diagram where the subharmonic oscillation has been prevented by use of known slope compensation techniques.

FIG. 4 shows how slope compensation is used to combat subharmonic oscillation. It shows a plot of the error amplifier output 400 and the measured inductor current 410 as in FIG. 1 and also a plot of the error amplifier output with the additional slope subtracted 420. By subtracting the slope from the error amplifier output, the comparator output changes when the measured inductor current equals the error amplifier output minus the additional slope. This removes the subharmonic oscillations. Exactly the same result can be achieved by adding the slope compensation to the measured inductor current instead of subtracting it from the error amplifier output.

It is often convenient in a DC-DC converter to use the signal of "error amplifier output minus slope" or "inductor current plus slope" to give a current limit. There are a number of known ways of doing this, and a common way is to simply limit (or "clamp") the voltage output of the error amplifier. In such a case this would mean that the error amplifier signal is not only used for control of the converter but also for current limiting. One drawback is that, as the clamping level is fixed, the effect of the "additional slope" results in the actual current limit of the regulator varying and being dependent on the duty cycle. For example, in FIG. 4, the current limit per cycle depends on where line 410 meets line 420, which depends on duty cycle, which in turn will depend on factors such as input voltage as well as on load current demand.

Figure 5:
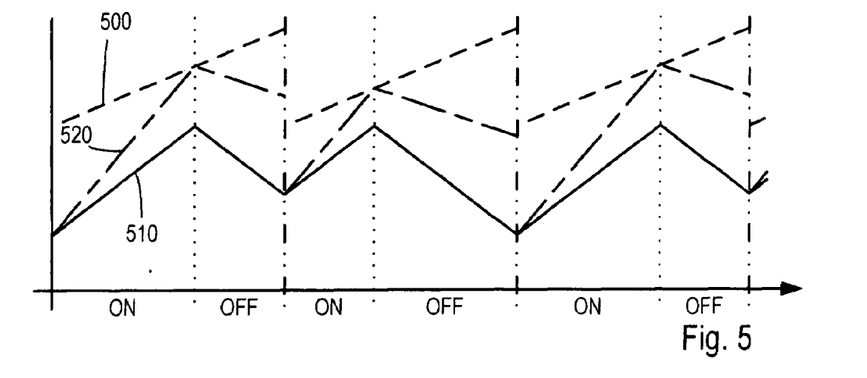
FIG. 5 shows a timing diagram whereby the current limit has been changed on a cycle by cycle basis to allow for the slope compensation.

FIG. 5 shows the results of the proposal disclosed in U.S. Pat. No. 6,611,131 which attempts to remove the effect of the "additional slope" for the current limit by increasing the current limit by the same amount on a cycle-by-cycle basis. It shows the current limit 500, the measured inductor current 510 and the "inductor current plus slope" signal 520. It can be seen that the measured inductor current 510 shows the same subharmonic oscillation as the measured inductor current 310 in FIG. 3 where no slope compensation was used.

Figure 6:
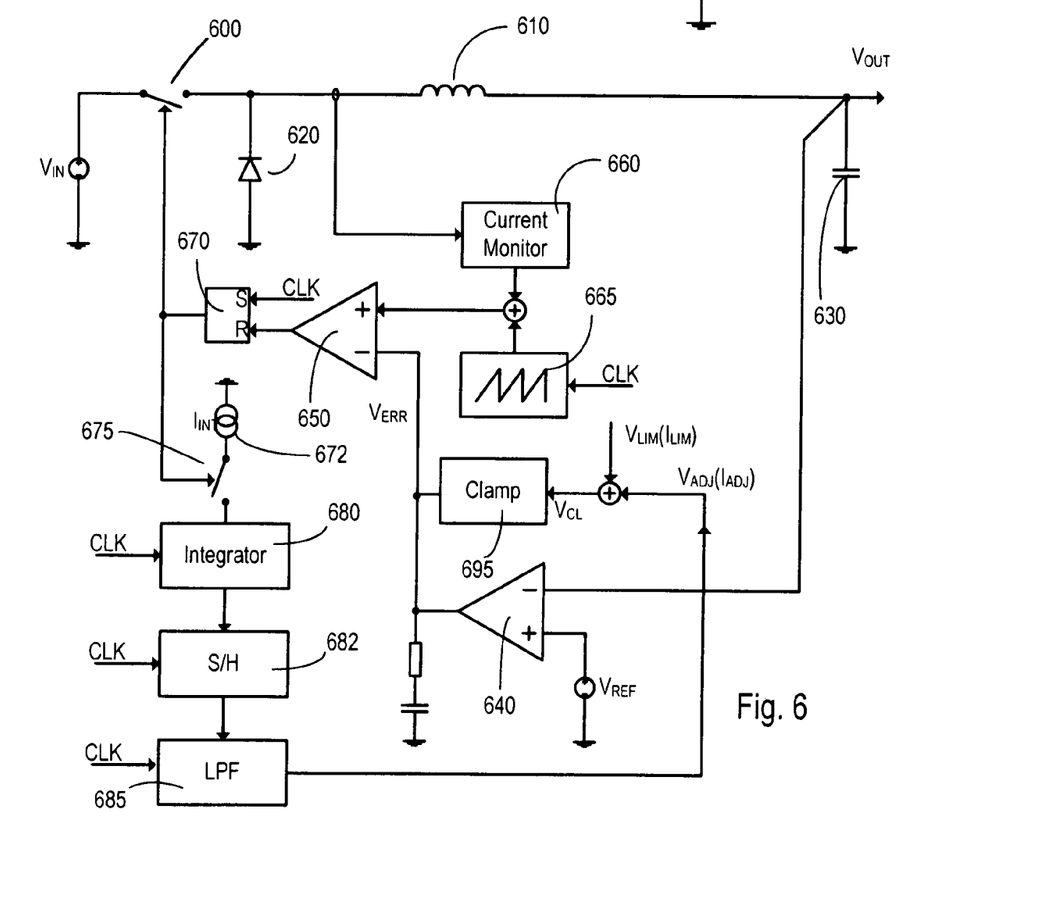
FIG. 6 shows a regulator according to a first embodiment of the invention.

FIG. 6 shows a circuit according to an embodiment of the invention. This shows the circuit of FIG. 1 with the addition of slope compensation. In addition to the components of FIG. 1 600-670, (corresponding to 100-170) this circuit comprises a ramp generator 665, a clamping circuit 695, a current source 672, a further switch 675, an integrator 680, a sample and hold circuit 682 and a low pass filter 685 arranged as shown. To implement slope compensation, ramp generator 665 generates a compensatory ramp signal which is added to the measured inductor current from the current monitor 660 and fed into the comparator 650. A clamp 695 is placed on the output $V_{ERR}$ of the error amplifier 640. The clamp 695 receives a current limit reference signal $V_{CL}$ which consists of a voltage $V_{LIM}$ representative of a constant current $I_{LIM}$, which sets the clamping limit and therefore the maximum current in the inductor when no slope compensation is used, added to a limit-adjustment voltage $V_{ADJ}$, representative of a signal $I_{ADJ}$, for adjusting this clamping limit to compensate for any slope compensation used. This ensures that the maximum current through inductor 610 remains substantially constant irrespective of the duty cycle. The signal $V_{ADJ}$ for adjusting the clamping limit corresponds by design to a fraction of the "additional slope", which is dependent on the duty cycle. To ensure that this fraction is dependent on more than one previous duty cycles the signal is first passed through a low pass filter 685. In this way subharmonic oscillation is prevented but the current limit will always be constant as set by $I_{LIM}$ (at least after a few cycles). In practice decoupling at input and output of the regulator will ensure that the input voltage and load current demand will not vary substantially cycle by cycle, so this delay in recovery of the actual limit current to its desired value $I_{LIM}$ will not result in substantial variation of the limited current.

In this embodiment, $V_{ADJ}$ is derived from a ramp signal which is a replica of the ramp signal produced by ramp generator 665 for at least part of each clock cycle. This ramp signal is produced by passing a constant current $I_{INT}$ from current source 672 through an integrator 680, possibly just a capacitor. Prior to being integrated, current $I_{INT}$ is passed through switch 675, which is in-phase with switch 600, so that this current is only transmitted when switch 600 is closed (that is the "on portion" of the clock cycle). The resultant intermediate signal thus ramps up, replicating the ramp signal produced by ramp generator 665 for the duration of the "on portion" of the clock cycle, and holding the achieved ramped value for the remainder of the clock cycle. This intermediate signal is then reset to zero at the end of each clock cycle. The intermediate signal is then passed through sample and hold circuit 682 and is then low pass filtered by filter 685, before being fed to the clamp 695.

The ramp generator 665 may generate its ramp using a current source charging a capacitor, the capacitor then being discharged at the end of each clock cycle. If so, the ramp signal at the output of the integrator 680 will be a replica of the output of ramp generator 665 if both signals are generated using the same value of current source current and capacitance. Alternatively, it may be convenient to scale the current of current source 672 and its load capacitance by the same factor, to obtain the same output ramp voltage. A further possibility is to scale the intermediate signal with respect to the compensatory ramp signal m, by scaling the current or capacitance separately, to compensate for other signal scaling introduced elsewhere in the regulator, e.g. to optimise signal swings.

An alternative would be to use the voltage from the output of ramp generator 665 (or a duplicated compensatory ramp current therefrom, if 665 is current-output), and to sample-and-hold this ramp at the end of the on portion of each clock cycle to provide a similar duty-cycle-dependent intermediate signal.

Various methods of clamping the output of an amplifier are well known. The clamp 695 may simply be a bipolar transistor with emitter connected to $V_{ERR}$, base connected to $V_{CL}$ and collector grounded, with $V_{LIM}$ suitably offset to compensate for the base-emitter voltage $V_{BE}$ of the transistor. Preferably and more accurately, the clamp 695 may comprise a transistor and a comparator. The comparator compares the output of the error amplifier to the current limit signal. Should the output of the error amplifier exceed the current limit signal, the comparator switches on the transistor which then diverts excess current from the output of the error amplifier 640 to ground, clamping the output of the error amplifier as a result.

The integration may be performed simply using a capacitor, with the resultant signal then filtered using a larger capacitor, for example by briefly connecting the first capacitor in parallel with the larger capacitor to share charge for a brief period each clock cycle. Alternatively, well-known op-amp-based integrator circuitry could be used.

The current source $I_{INT}$ and integrating capacitor within 680 could be designed to be the same as equivalent devices within ramp generator 665: for an integrated circuit implementation, as relative accuracy within semiconductor integrated circuits is excellent, there would be excellent matching between the compensation ramp voltage and the "duty cycle"-factored voltage $V_{ADJ}$.

The corner frequency of the low pass filter is chosen to be lower than the clock frequency of the converter. If the corner frequency is, for example, 10 times lower, then a change in the duty cycle of the converter of say 10% will only be fully seen on the output of the low pass filter after approximately 5 time constants of the filter (with a time constant being $10/(2 \times \pi \times f_{CLK}) \approx 1.6 \times T_{CLK}$ in this example (where $f_{CLK}$ is the clock frequency and $T_{CLK}$ is the clock period)).

Figure 7:
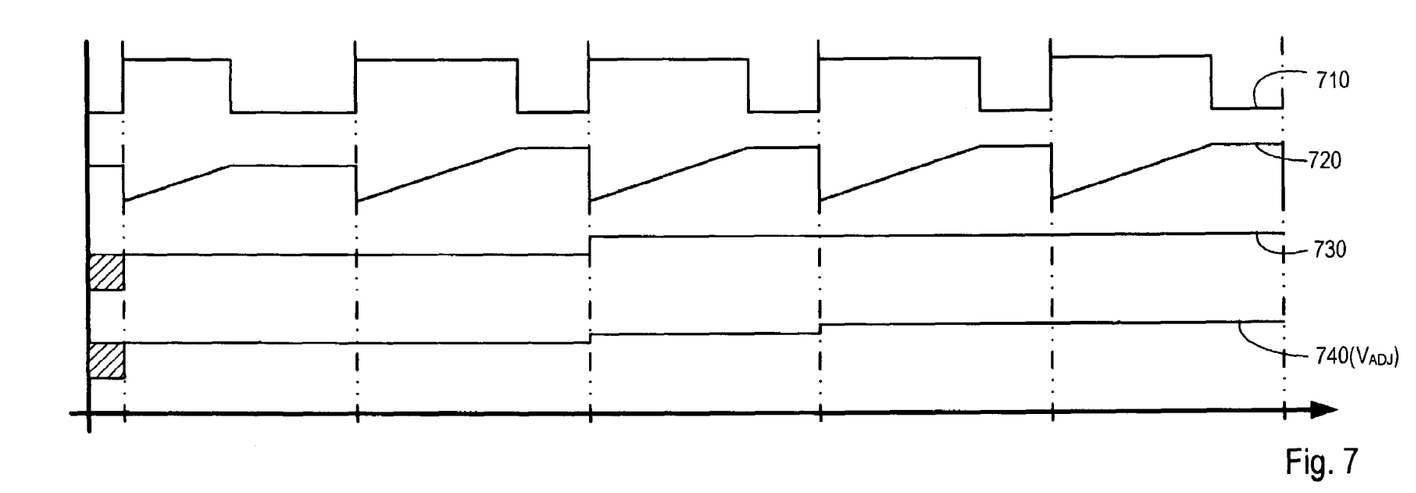
FIG. 7 shows timing diagrams at different points in the circuit of FIG. 6.

FIG. 7 shows the signals produced at certain points of the above circuit. Line 710 shows the control signal for the switches 675, 600. Line 720 shows the intermediate signal, at output of integrator 680. Line 730 shows the signal at the output of the sample and hold 682 and line 740 shows the limit-adjustment signal $V_{ADJ}$ at the output of the low pass filter 685. As the duty cycle is increased after the first cycle, a greater proportion of the slope (corresponding to this new duty cycle) is passed through to the input of the sample and hold 682. By the end of the second cycle the signal held by the sample and hold will be higher than the previous cycles. This signal is then passed through the low pass filter 685, which ensures that the stepped up signal $V_{ADJ}$ 740 takes a number of clock cycles to increase. For illustrative purposes only, it is assumed that the filter is a two-stage FIR filter (possibly using switched capacitors) with impulse response (0.5, 0.5), so half the required step increase occurs immediately, and the remaining half at the next clock cycle. More practically, a response lasting in the order of ten or twenty cycles or more would be chosen. Also the low pass filter could be a more conventional continuous-time filter with resistors and capacitors. This would result in $V_{ADJ}$ varying continuously, rather than being piecewise constant as shown, but the overall operation would be very similar. Also as stated above, some or all signals could be current-domain, in which case a switched-current filter might be employed.

Figure 8:
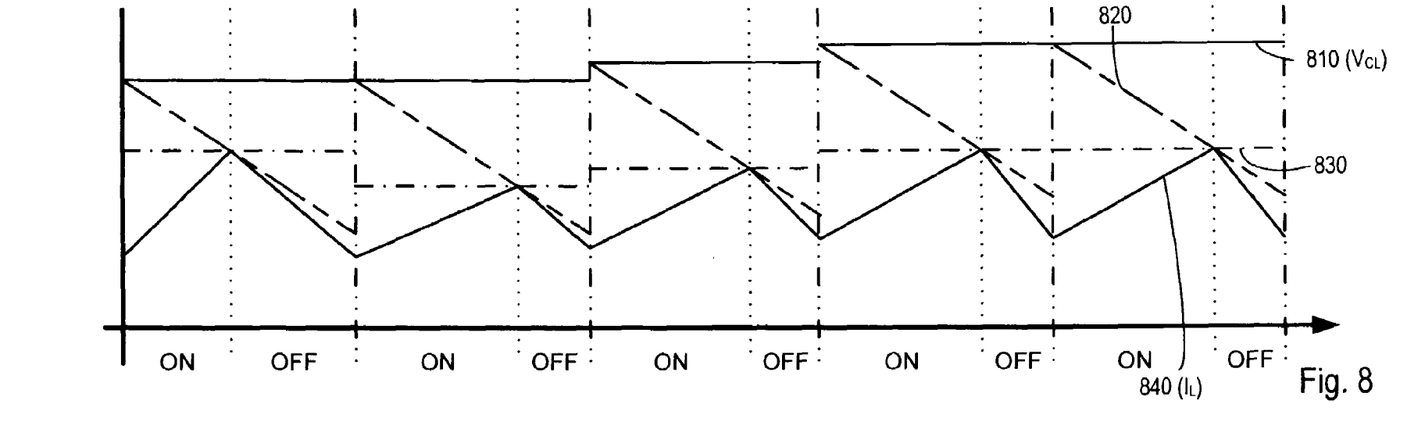
FIG. 8 shows a timing diagram whereby the clamping level is adjusted in accordance with an embodiment of the invention.

FIG. 8 shows the consequences of the changes shown in FIG. 7 where the current limit is restored to its former level over two cycles. Line 810 shows the current limit reference signal $V_{CL}$ to set the clamping limit. In the embodiment the compensatory ramp signal is added to the measured inductor current before comparison with the reference signal $V_{ERR}$. This is mathematically equivalent to comparing the inductor current to the reference signal minus the compensatory ramp signal, so trace 820 shows the reference signal minus the compensatory ramp signal, to aid explanation, even though this signal may not be present in an embodiment. Trace 830 shows the resulting level at which the comparator 650 will switch (at the point when the measured inductor current 840 meets this calculated waveform 820) thus resulting in a current limit.

In this case the regulator is operating in current limit and the error amplifier output $V_{ERR}$ is being held at the clamping limit by the clamp. When, for example, the load current demand decreases, the output voltage $V_{OUT}$ of this buck converter operating in current limit will rise, and as a consequence the up-slope (dependent on $V_{IN}-V_{OUT}$) will decrease and the down-slope of the inductor current (dependent on $V_{OUT}$) will increase. As a result there is an increase in duty-cycle (shown after the first clock period) and, as a consequence, the resulting current limit initially falls due to the effect of the slope compensation. The clamping limit is then increased each cycle as the limit-adjustment signal settles to its new value, until the clamping limit reaches the new value appropriate for the duty cycle, giving the same maximum inductor current as before. Of course it is more likely that the change in current limit is more continuous, and is probably averaged over a number of cycles.

It should be understood that the above circuit operates only to adjust the clamping limit to compensate for the effect of the slope compensation on the current limit. Therefore this adjustment is relevant only when the circuit is operating at or near the current limit. When operating below this limit the error amplifier output level would be below the clamping limit and the regulator operates normally (although the clamping limit is always set, regardless of whether the circuit is operating at the current limit or not). This is illustrated in FIG. 9.

Figure 9:
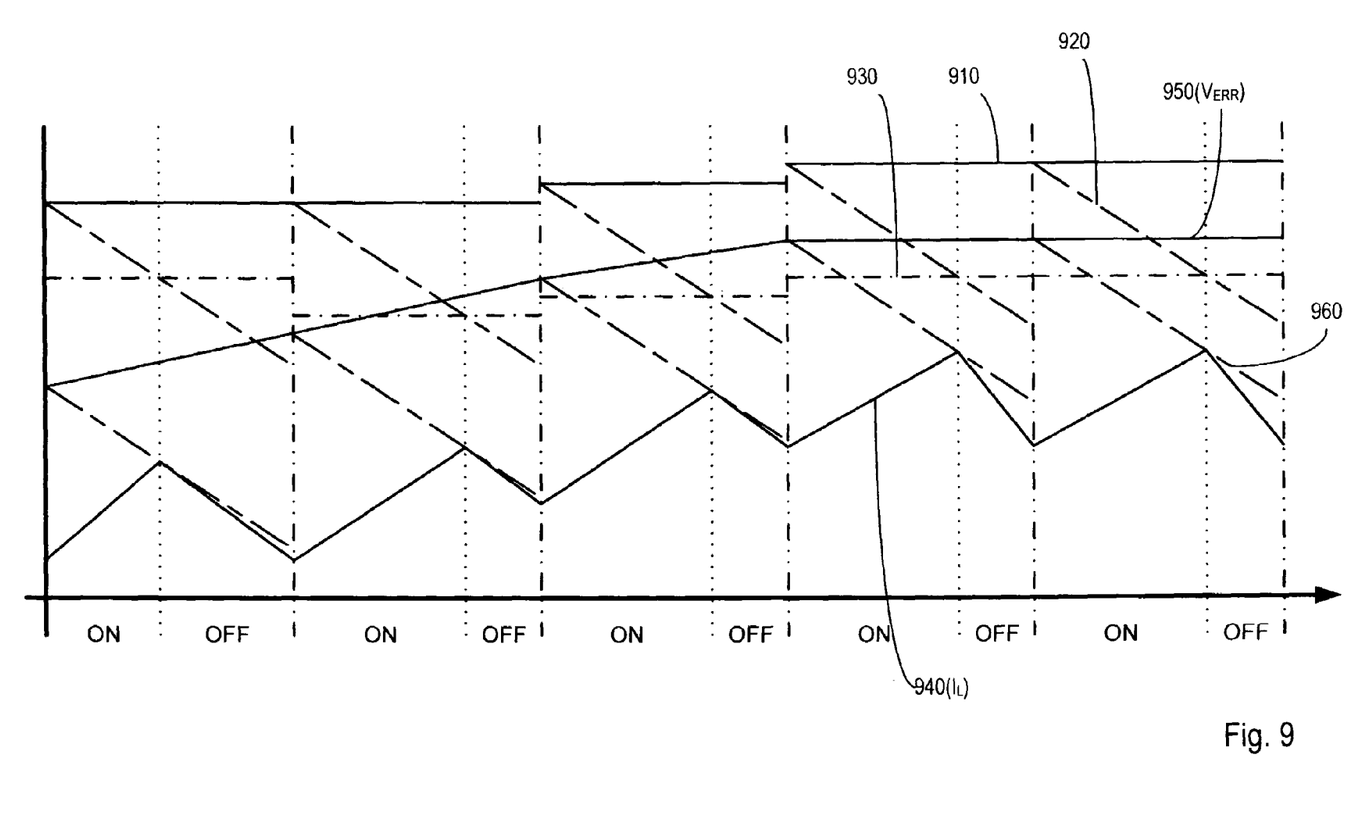
FIG. 9 shows a timing diagram for a regulator according to an embodiment of the invention working below the clamping level.

In FIG. 9, line 910 shows the current limit reference signal $V_{CL}$ to set the clamping limit. Line 920 shows the reference signal minus the compensatory ramp signal (this is shown for illustration purposes, but is usually not available nor required in the circuit). Line 930 shows the actual resulting current limit. Line 940 shows the measured inductor current, 950 shows the signal at the output of the error amplifier $V_{ERR}$ and 960 shows the signal at the output of the error amplifier $V_{ERR}$ minus the compensatory ramp signal (again calculated).

In this example of operation, the load current demand increases, initially causing $V_{OUT}$ to drop. This causes the error amplifier output 950 (not clamped in this case) to increase as shown by the upward slope in this trace over the first three cycles, this causing an increase in duty cycle. The increased duty cycle causes the peak current in the inductor to increase and finally settle to a new value appropriate for the new load. As can be seen, the clamping limit 910 is also adjusted to accommodate the new duty cycle, but as the peak inductor current does not reach the current limit, this change has no other effect on the regulator or its output. Line 930 shows that the current limit does not vary with the duty cycle, apart from the deliberately imposed settling time.

Figure 10:
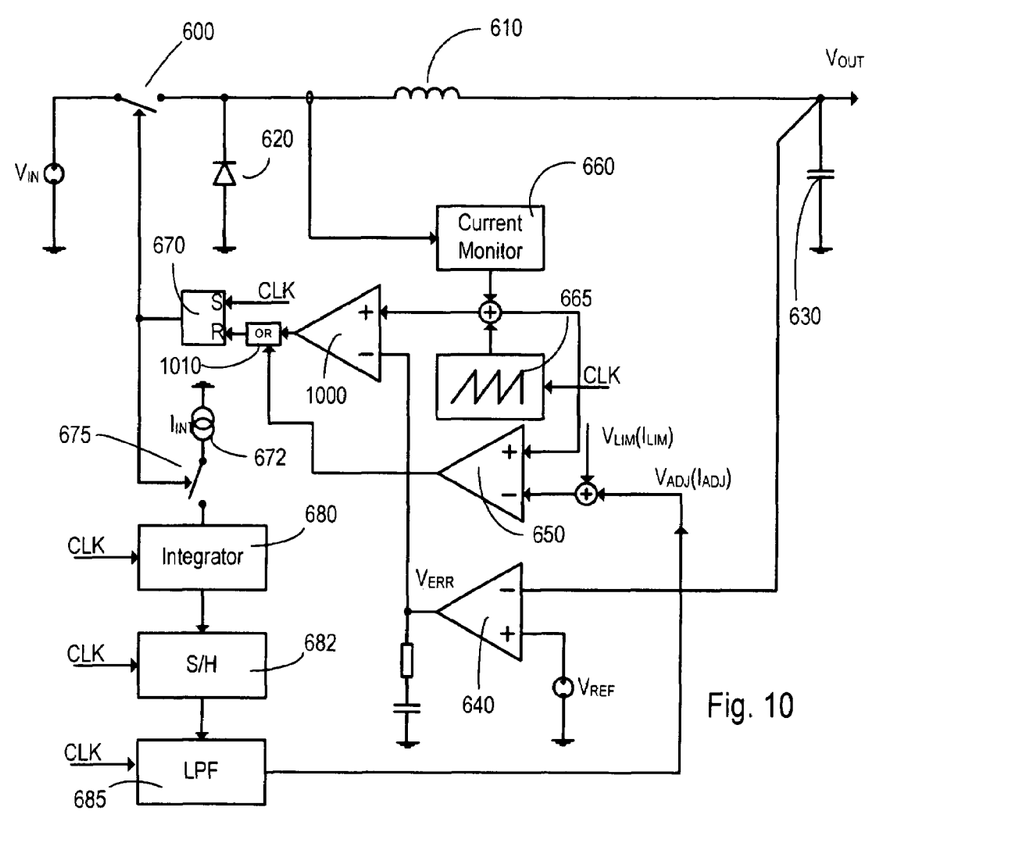
FIG. 10 shows a regulator according to a second embodiment of the invention.

FIG. 10 shows an alternative circuit to that of FIG. 6. As before, the error amplifier 640 is connected to comparator 650, whose other input is the combination of measured inductor current and slope compensation signal. However in this case the clamp 695 is absent, and current limit reference signal $V_{CL}$ is applied directly to the input of a second comparator 1000 where it is also compared to the combination of measured inductor current and slope compensation signal. The two comparator 650, 1000 outputs are logically combined using OR gate 1010.

In operation the comparator 650 works as previously described in relation to FIG. 6 when not in current limit, i.e. when the clamp is not clamping the error amplifier output in that circuit. Each cycle it produces a first control signal to turn off the main switch when the inductor current has risen to a value defined by the error amplifier 640, thus controlling the inductor current to that required to provide the required output voltage.

Comparator 1000 compares the sum of measured inductor current and slope compensation signal to the current limit reference signal $V_{CL}$, $V_{CL}$ being the sum of $V_{LIM}$ and the adjustment signal $V_{ADJ}$. If the measured inductor current rises to too high a value, comparator 1000 produces a second control signal to turn off the main switch at that point in the cycle. In steady state, $V_{ADJ}$ will settle to the value which cancels the effect of the slope compensation signal on the current limit, so the current threshold will be when the measured inductor current corresponds to $V_{LIM}$.

The two control signals feed into an "OR" gate 1010 such that latch 670 is reset should either condition be met, i.e. the slope compensated current monitor 660 output signal exceed either error amplifier output $V_{ERR}$ or the signal ($=V_{LIM}+V_{ADJ}$). Each clock cycle the former will occur first if the regulator is not in current limit, the second will occur first if the regulator is in current limit, i.e. the inductor current has to be limited before reaching the value required to satisfy the load current demand.

It is envisaged that such techniques as disclosed herein has many applications. One such use is on an audio power management circuit. It could also be used in circuits providing backlighting for displays (e.g. using white LEDs). It is also particularly suited to camera flash circuits which tend to operate in current limit during the flash time.

Similar techniques could also be used to prevent subharmonic oscillations in related circuits, for example in Class-D audio amplifiers (e.g. in M. Berkhout, "Integrated Overcurrent Protection System for Class-D Audio Power Amplifiers," *IEEE J. Solid-State Circuits*, vol. 40, no. 11, pp. 2237-2245, November 2005).

The foregoing example is for illustrative purposes only. For example the converter may be any type of DC-DC converter, such as a boost or inverting or non-inverting buck-boost converter instead of the buck converter illustrated. The integrator, ramp generator, clamp or sample and hold circuit may be of any kind known or devised. Or instead of the sample-and-hold circuit a further current source (as 672), switch (as 675) and integrator could be used alternately with current source 672, switch 675 and integrator 680 with the switch in each case left open for a further cycle (therefore holding the signal constant during this further cycle) before being closed. The resultant signals could then be multiplexed together to obtain a signal made up of the portions of the resultant signals when being held throughout the cycle (switch open).

Consequently, it should be understood that other embodiments and variations are envisaged without departing from the spirit and scope of the invention.

What is claimed is:

1. A current-mode switching regulator comprising at least: an inductor; a main switch for controlling the current flow through the inductor; and a feedback control circuit for operating the main switch cyclically and to vary a duty cycle of the main switch so as to substantially maintain an output voltage of the regulator at a desired level, said feedback control circuit further including slope compensation circuitry for introducing an offset into a comparison between a signal representing the fed-back output error voltage and a signal representing the inductor current, wherein said regulator further comprises current limiting circuitry for controlling said main switch responsive to a current limit reference signal, said current limit circuitry comprising adjustment circuitry for adjusting said current limit reference signal in response to the duty cycle of more than one previous cycle so as to limit current in the inductor irrespective of said output voltage and to a value which, in the steady state, is substantially independent of the duty cycle.

2. The regulator of claim 1 wherein said current limit circuitry controls the main switch on the basis of a combination of the current limit reference signal and one or a combination of the fed-back output error voltage signal, the inductor current signal and a slope compensation signal.

3. The regulator of claim 2 arranged such that said current limit circuitry controls the main switch by means of a clamping circuit to act on said feedback control circuit, said clamping circuit being controlled by said current limit reference signal.

4. The regulator of claim 3 wherein said clamping circuit is operable to compare the signal representing the fed-back output error voltage to the current limit reference signal and, should the signal representing the fed-back output error voltage exceed current limit reference signal, causes the signal representing the fed-back output error voltage to be clamped.

5. The regulator of claim 4 wherein said clamping circuit comprises at least a comparator for comparing the signal representing the fed-back output error voltage to the current limit reference signal, and a transistor for diverting excess current to ground in order to clamp said signal representing the fed-back output error voltage.

6. The regulator of claim 2 arranged such that said current limit circuitry controls the main switch on the basis of a comparison of the current limit reference signal and a combination of the inductor current signal and said slope compensation signal.

7. The regulator of claim 6 wherein said current limiting circuitry comprises a comparator for comparing the current limit reference signal and said signal representing the inductor current offset by said slope compensation circuitry, said main switch being reset should said signal representing the inductor current offset by said slope compensation circuitry exceed the current limit reference signal regardless of the result of the comparison between the signal representing the fed-back error voltage and the signal representing the inductor current offset by said slope compensation circuitry.

8. The regulator of claim 7 wherein said current limiting circuitry further comprises an OR gate such that the main switch is reset should the signal representing the inductor current offset by said slope compensation circuitry exceed either the current limit reference signal or the signal representing the fed-back output voltage.

9. The regulator according to claim 1 wherein said adjustment circuitry further comprises a low pass filter arranged to receive for each cycle a value representative of the duty cycle in that clock cycle and to combine the values for several clock cycles to generate said current limit reference.

10. The regulator according to claim 9 wherein said low pass filter has a corner frequency less than the clock frequency of the regulator.

11. The regulator according to claim 10 wherein the corner frequency of the low pass filter is an order of magnitude less than the clock frequency of the regulator.

12. The regulator according to claim 1 wherein said slope compensation circuitry in operation generates a ramp signal of a predetermined amplitude during each clock cycle, and said adjustment circuitry comprises a sample and hold circuit operable in each cycle to capture a value representative of a proportion of the ramp amplitude defined by the duty cycle in that clock cycle.

13. The regulator according to claim 1 wherein said adjustment circuitry is arranged to generate a ramp signal replicating a ramp signal generated within said slope compensation circuitry, the replica ramp signal being used to generate for each clock cycle a value representative of a proportion of the ramp amplitude defined by the duty cycle in that clock cycle.

14. The regulator according to claim 13 wherein in operation the generation of the replica ramp signal is interrupted in phase with opening of the main switch so as to ramp only as far as said representative value and then to hold its value for use in generating the current limit reference signal.

15. The regulator according to claim 12 wherein a sample and hold circuit is connected to receive said replica ramp signal and to hold said representative value.

16. The regulator according to claim 1 wherein there is further provided scaling circuitry to scale the signals in various parts of the circuit.

17. The regulator according to claim 16 wherein said scaling circuitry is arranged to scale an intermediate signal used by said adjustment circuitry to generate said current limit reference signal, and which is of a different scale to the compensatory ramp signal, to maintain the same overall signal transfer functions as in the unscaled circuit.

18. The regulator according to claim 16 wherein said scaling includes scaling signals between current and voltage representations for scaling said signal corresponding to a proportion of the compensatory ramp signal.

19. The regulator according to claim 1 wherein the regulator comprises a rectifier.

20. The regulator according to claim 19 wherein said rectifier is a diode.

21. The regulator according to claim 19 wherein said rectifier is a second switch arranged to run synchronous with said main switch.

22. The regulator according to claim 21 wherein said main and second switches are arranged to be in antiphase with each other for most of the operating modes.

23. The regulator according to claim 1 comprising a current monitor for measuring the current in the inductor.

24. The regulator according to claim 1 arranged to function as a buck (step down) regulator.

25. The regulator according to claim 1 arranged to function as a boost (step up) regulator.

26. The regulator according to claim 1 arranged to function as a buck-boost regulator.

27. The regulator according to claim 1 wherein said feedback control circuit comprises an error amplifier for producing said signal representing the fed-back error voltage from the regulator output by comparing said regulator output to a given reference.

28. A current-mode switching regulator comprising at least
 a main switch which controls the current flow through the inductor;
 a comparator which controls the main switch based on the current in the inductor and a reference signal fed back from a voltage output of the regulator, whereby the duty cycle of said main switch, and hence a peak current in the inductor, will change to compensate for a change in output voltage;
 a signal generator for generating a ramp signal and using this for slope compensation by offsetting one of the comparator input signals relative to the other with said ramp signal; and
 current limiting circuitry for generating a limit-adjustment signal corresponding to a proportion of the compensatory ramp signal, said proportion being dependent on the duty cycle of more than one previous clock period of the regulator, and using said limit-adjustment signal to clamp one of the comparator input signals;

thereby substantially maintaining the inductor current limit independent of duty cycle.

29. A current-mode switching regulator comprising at least
a main switch which controls the current flow through the inductor;
a comparator which controls the main switch based on the current in the inductor and a reference signal fed back from a voltage output of the regulator, whereby the duty cycle of said main switch, and hence a peak current in the inductor, will change to compensate for a change in output voltage;
a signal generator for generating a ramp signal and using this for slope compensation by offsetting one of the comparator input signals relative to the other with said ramp signal; and
current limiting circuitry for generating a limit-adjustment signal corresponding to a proportion of the compensatory ramp signal, said proportion being dependent on the duty cycle of more than one previous clock period of the regulator, and using said limit-adjustment signal to obtain a limit signal for comparison with a signal representative of the current in the inductor, whereby the limit signal or the signal representative of the current in the inductor is offset relative to the other with said ramp signal;
thereby substantially maintaining the inductor current limit independent of duty cycle.

30. A current mode switching regulator comprising:
current limiting circuitry for monitoring a first signal indicative of the current flow through the regulator with respect to a current limit reference signal so as to prevent current flowing through the regulator above a current limit; and
slope compensation circuitry for applying a time varying offset to at least one of the first signal and the current limit reference signal which are monitored by the current limiting circuitry;
wherein the current limiting circuit comprises an adjustment circuit for compensating for the effect of the time varying offset on the current limit; and
wherein the adjustment circuit provides an adjustment based on the duty cycle of more than one previous cycle of the regulator.

31. A current mode switching regulator comprising:
an inductor;
a main switch for controlling the current flow through the conductor;
a current monitor for generating a first signal based on the current flow through the conductor;
current limiting circuitry for monitoring said first signal with respect to a current limit reference signal and, based on said monitoring, arranged to generate a switch control signal if the current flow through the inductor reaches a current limit so as to prevent current flowing through the regulator above the current limit;
slope compensation circuitry for applying a time varying offset to at least one of the first signal and the current limit reference signal which is monitored;
wherein the current limiting circuit is arranged to provide an adjustment to the monitoring of the first signal with respect to the current limit reference signal so as to compensate for the effect of the time varying offset applied to the first signal or current limit reference signal, the amount of adjustment being based on an adjustment signal and wherein the current limiting circuitry comprises an adjustment circuit for monitoring the duty cycle of a plurality of cycles and generating said adjustment signal having a value based on the duty cycles of more than one previous cycle.

32. A method of providing current limit control in a current mode switching regulator comprising the steps of:
taking a first signal indicative of the current in the regulator;
taking a current limit reference signal;
wherein at least one the first signal and the current limit reference signal has a slope compensation time varying offset applied thereto;
generating an adjustment signal having a value based on the duty cycle of more than one previous cycle;
monitoring the first signal with respect to the current limit reference signal so as to determine if the current in the regulator reaches a current limit wherein said monitoring step includes using said adjustment signal to compensate for any slope compensation applied to the first signal and the current limit reference signal.

* * * * *